(12) United States Patent
Wetli et al.

(10) Patent No.: US 6,322,296 B1
(45) Date of Patent: Nov. 27, 2001

(54) PRECISION MILLING CUTTER EQUIPPED WITH CUTTING TIPS

(75) Inventors: Markus Wetli, Dintikon (CH); Rolf Huber, Tübingen (DE)

(73) Assignee: Walter AG, Tubingen (DE)

( * ) Notice: Subject to any disclaimer, the term of this patent is extended or adjusted under 35 U.S.C. 154(b) by 0 days.

(21) Appl. No.: 09/447,970

(22) Filed: Nov. 23, 1999

(30) Foreign Application Priority Data

Nov. 28, 1998 (DE) .............................. 198 55 045

(51) Int. Cl.$^7$ ...................................... B23C 5/20
(52) U.S. Cl. ............... 407/42; 407/43; 407/47; 407/53
(58) Field of Search ............... 407/42, 43, 46, 407/47, 53, 57, 59, 61, 63, 113, 114, 115, 116

(56) References Cited

U.S. PATENT DOCUMENTS

| | | | |
|---|---|---|---|
| 3,859,700 | * | 1/1975 | Jilbert .......................... 29/96 |
| 4,790,693 | | 12/1988 | Koblesky . |
| 5,083,887 | | 1/1992 | Dotany . |
| 5,123,786 | * | 6/1992 | Yates et al. .................. 407/61 X |
| 5,391,616 | | 2/1995 | Daub . |
| 5,791,832 | * | 8/1998 | Yamayose .................... 407/61 X |
| 5,908,269 | * | 6/1999 | Cox ............................. 407/59 |
| 5,911,548 | * | 6/1999 | Deiss et al. .................. 407/61 X |
| 6,149,355 | * | 11/2000 | Frouquer et al. ............... 407/113 |

FOREIGN PATENT DOCUMENTS

| | | |
|---|---|---|
| 0 089 545 A1 | 9/1983 | (DE) . |
| 38 12 150 | 9/1989 | (DE) . |
| 0 278 389 | 8/1988 | (EP) . |
| 0 711 619 | 5/1996 | (EP) . |
| 08187609-A * | 7/1996 | (JP) ...................... 407/114 |

OTHER PUBLICATIONS

Patent Abstracts of Japan, vol. 5, No. 68 (M–067) May 8, 1981, and JP 56021711A.

* cited by examiner

Primary Examiner—Henry Tsai
(74) Attorney, Agent, or Firm—Frishauf, Holtz, Goodman, Langer & Chick, P.C.

(57) ABSTRACT

A machining tool (1) has a tool body (2) with tip seats (6, 7, 8, 9), to which cutting tips (11, 12, 13, 14) are assigned fixedly and individually. The cutting tips (11, 12, 13, 14) belong to a set of cutting tips. The machining tool (1) includes further sets of cutting tips, again with cutting tips (11, 12, 13, 14) individually assigned to the tip seats (6, 7, 8, 9). In order to assure that each cutting tip (11, 12, 13, 14) will be mounted on the tip seat (6, 6a, 7, 7a, 8, 8a, 9, 9a) on which it was ground, both the tip seats (6, 7, 8, 9, 6a, 7a, 8a, 9a) and cutting tips (11a through 14a) are provided with markings (34, 35), which allow an unequivocal, unmistakable association.

23 Claims, 4 Drawing Sheets

PRECISION MILLING CUTTER EQUIPPED WITH CUTTING TIPS

FIELD OF THE INVENTION

The invention relates to a machining tool, in particular a milling tool for precision machining operations, which is equipped with releasably secured cutting tips.

BACKGROUND OF THE INVENTION

Precision machining operations where high precision is demanded for the workpiece make high demands for precision of the tool as well. For instance, if complicated geometries are to be formed in one milling machining step, then as a rule high speed steel (HSS) milling cutters are used, which can have a relatively complicated contour. In the production of turbine rotors, for instance, undercut slots in a rotor shaft must be made, into which correspondingly shaped roots of turbine blades are thrust. The slots have a Christmas tree profile as a rule and are undercut multiple times. The desired shape of the slot must be formed with a high degree of precision during milling.

To this end, it is known from German Patent DE 196 11 276 C1 to first open the desired slot without an undercut, and then to make the undercuts, using a milling tool equipped with indexable cutting tips, in a roughing-down machining operation. The desired precision is then attained in one or more work steps using an HSS end milling cutter. Such an HSS end milling cutter has only relatively little material to remove. Nevertheless, the feeding speed cannot be increased without limit. HSS milling cutters are inferior in terms of their cutting speed to hard-metal-equipped milling cutters.

HSS milling cutters have to be reground from time to time. In the process, especially if the outer contour of the milling cutter defines the contour of the slot to be made, the milling contour must not be changed in the regrinding. To achieve this, the tool faces are as a rule made curved adjoining the cutting edge, or in other words are provided with a radial relief. The regrinding of the HSS milling cutter is then done by regrinding the chip face, without machining the tool face. This brings about an only slight reduction in the diameter.

In most cases, the slight clearance angle necessitates machining the workpiece in synchronism. This means that the feeding direction of the workpiece essentially matches the direction of motion of the cutting edge in engagement with the workpiece. In an individual case, however, synchronized machining can cause microscopic cracks or roughness in the machined surface, which can be problematic, especially for components subjected to heavy loads.

SUMMARY OF THE INVENTION

An object of the invention is to create a machining tool with which precision machining can be accomplished economically, is at a high machining speed.

This and other objects are attained in accordance with one aspect of the invention directed to a machining tool having a plurality of tip seats, which are arranged to receive correspondingly formed cutting tips. At least one cutting tip, which belongs to at least one set of cutting tips, is assigned to each tip seat. Preferably, however, each tool body is assigned a plurality of sets of cutting tips, and each set of cutting tips contains precisely one cutting tip for each tip seat. The fixed association of the tip seat and cutting tip, once defined, is then kept permanently. As a result, it can be attained that dimensional variations or tolerances in the tip seat and the cutting tip will have no influence on the precision in terms of the shape and position of the cutting edge of a cutting tip relative to the pivot axis of the machining tool. The cutting tip can be released from the tip seat and secured to it repeatedly, without causing any dimensional variation. The tool body acts both as the tool base body in the strict sense and as a cutting tip holder in the fine-machining of the cutting tips. The accuracy of the cutting edges can be substantially greater as a result than the accuracy of the tip seats.

To assure the desired association between the cutting tip and the tip seat and the permanent adherence to this association, the cutting tips are preferably provided with an individual marking, which designates the tip seat to which they are assigned. The marking may be an engraving, a colored mark, or a special shape, or some other permanent labeling that survives the subsequent machining work. This survival can be attained if the tip seats each have independent shapes. However, this can involve additional expense for production. For production reasons and for the sake of a uniform support of the cutting tips on the tool body in as optimal a way as possible, it is preferred that identical tip seats be used. To prevent mistaken placement of the cutting tips, the cutting tips are provided with markings that designate the assigned tip seat. A marking that designates the tool body can be provided as well. This prevents the cutting tip from being incorrectly secured to a tool body that has different tolerances.

Because of the individual association of the tips with the tip seats and tool bodies, a tool accuracy of approximately ±0.01 mm can be attained with the milling tool equipped with the cutting tips. The tool equipped with cutting tips thus makes it possible to perform machining with accuracies that were previously reserved to HSS tools. At the same time, however, a very high machining speed is attained.

The economical use of such tools is still further improved because regrinding is no longer necessary. If the cutting edges are worn, the set of cutting tips is removed from the tool body, and the tool body is then equipped with a new cutting tip set intended for it and individually ground. As a result, the precise shape of the machining tool is established immediately and without complicated adjustment provisions, and it can continue to be employed.

The cutting edges of the cutting tips supplement one another to form at least one complete cutting blade. Particularly in the tooth tip regions, overlapping regions can be provided in which the number of blades is more than one. In this way, the wear of cutting edges disposed obliquely and parallel to the pivot axis can be assimilated to one another.

Not only the cutting edges but also the tip seats can be provided with markings, which enable a simple association with the cutting tip markings. The markings can be provided in the form of symbols or numerals or a letter code.

The cutting tips are preferably provided with a positive clearance angle. The clearance angle is obtained by means of a chamfered ground section adjoining the cutting edge. The tool face rests on a straight line extending away from the cutting edge. As a result, the clearance angle immediately adjacent to the cutting edge is also other than zero. This permits milling machining with a positive effective cutting angle in reverse rotation; that is, as a consequence of the rotation of the milling tool, the cutting edge moves counter to the feeding direction of the tool on the workpiece. This yields a good surface quality even at high cutting speeds. The cutting tips are preferably installed on the tool body with an axial effective cutting angle of 0°, and the result of this is constant cutting conditions along each cutting edge. Relative to one another, the cutting tips are preferably offset in spiral fashion (along a helical line) in order to even out the cutting forces. This is advantageous in terms of chip removal. Furthermore, a relatively uniform force acting radially on the machining tool, whose peak value is less, results. Elastic deformation and thus inaccuracies in machining are minimized.

Once the cutting tips have been produced, for instance in a sintering process, the cutting tips are provided both before and immediately after the initial installation in a tool body with the appropriate marking, which identifies the respective tip seat and tool body. In the installed state, the cutting tips are then ground in a precision-grinding process, so that the outer contour or the geometry of the cutting edges of the milling tool is defined precisely. Once this process is ended, the cutting tips are removed and subjected to further machining. This can be a purposeful rounding of the cutting edges and a surface treatment, such as coating with titanium nitride (TiN), titanium carbide (TiC), titanium carbonitride (TiCN), titanium aluminum nitride (TiAlN) or other hard materials, a PVD coating, or the like. In the process, the marking of the indexable cutting tip is not is: destroyed and remains legible. One set of cutting tips is now complete. Additional sets of cutting tips can be produced in the same way for the same tool body. These sets of cutting tips are assigned to the tool body and are intended only for that tool body.

The number of sets of cutting tips that can be produced in this way for the special tool body is unlimited. The tool body is then shipped with the suitably sorted and packed sets of cutting tips. The user can equip the tool body on site with cutting tips of a set and can replace them as needed, for instance if they become worn, with cutting tips of a different set of cutting tips. As a rule, an entire set of cutting tips is replaced at a time. If little accuracy is needed, however, it is also possible to replace individual cutting tips. This makes it possible to furnish additional examples of cutting tips that are subject to especially heavy loads.

DETAILED DESCRIPTION OF THE INVENTION

Figure 1:
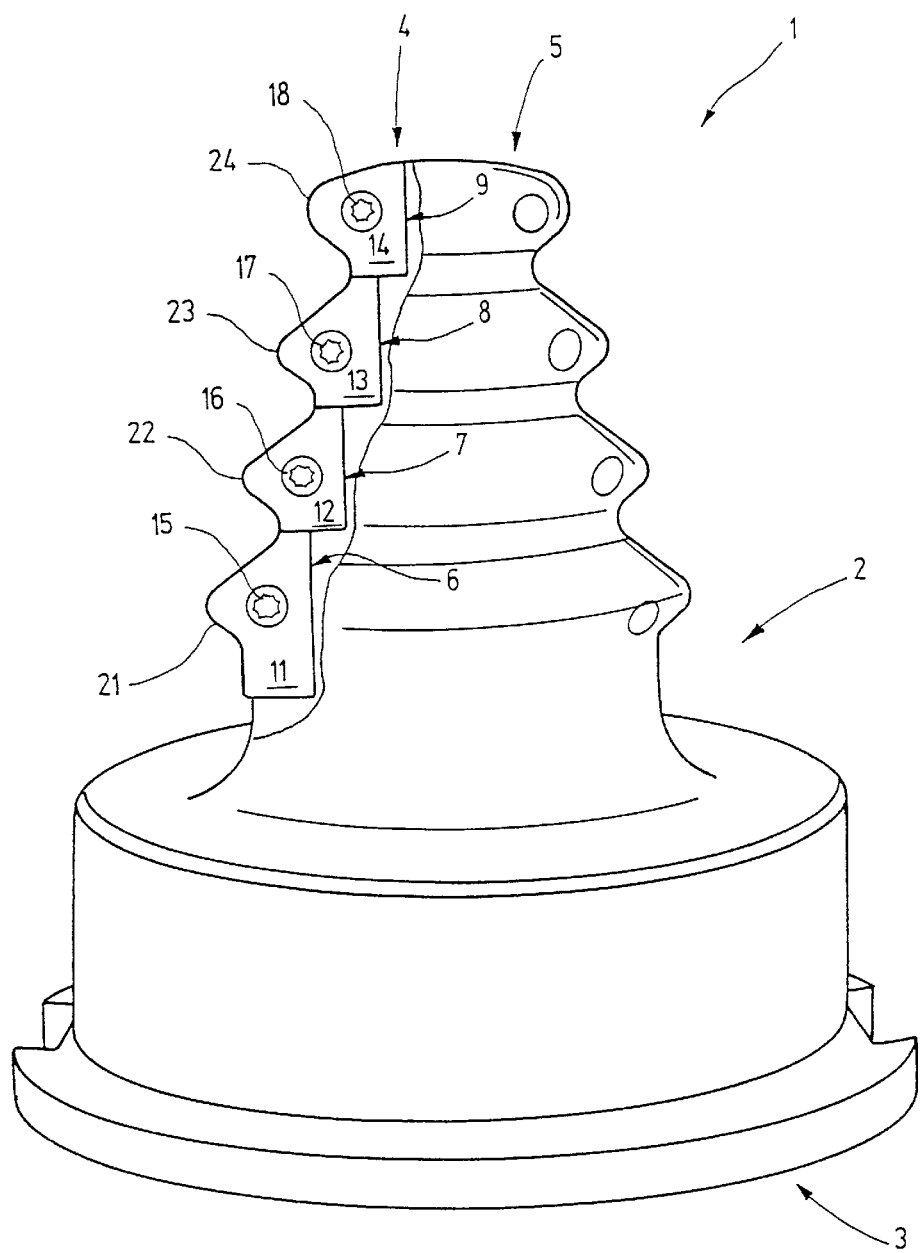
FIG. 1 is a perspective view of a tool body equipped with cutting tips.

In FIG. 1, a profile milling cutter 1 is shown, of the kind that can be used, for instance, to machine the profiled slot in a As turbine rotor for the root of a turbine blade. Such a turbine rotor can be found, for instance, in German Patent 196 11 276 C1. The profile milling cutter 1 has a tool body 2, which is provided on one end 3 with a receptacle for a work spindle. On its opposite end, the tool body has a profile corresponding approximately to the slot to be machined. In the longitudinal direction, two chip grooves 4, 5 are formed, in which tip seats 6, 7, 8, 9 are embodied. Cutting tips 11, 12, 13, 14 are retained on the tip seats. The cutting tips 11, 12, 13, 14 are each firmly clamped by a central fastening screw 15, 16, 17, 18 and pressed against the tip seat 6, 7, 8, 9.

Each cutting tip 11, 12, 13, 14 has at least one respective cutting edge 21, 22, 23, 24, which determines the outer contour of the milling tool. The cutting tips 11 through 14 are disposed on a straight line, for instance, as seen particularly from FIG. 3. Thus, the cutting edges 21 through 24 supplement one another to make one single, continuous cutting edge. Thus, the relief flank surfaces and cutting rake surfaces of the cutting tips 11, 12, 13, 14 adjoin one another smoothly. The tool faces are ground such that a positive clearance angle exists. The radial effective cutting angle is preferably set to be positive, and the axial effective cutting angle is preferably zero.

Figure 2:
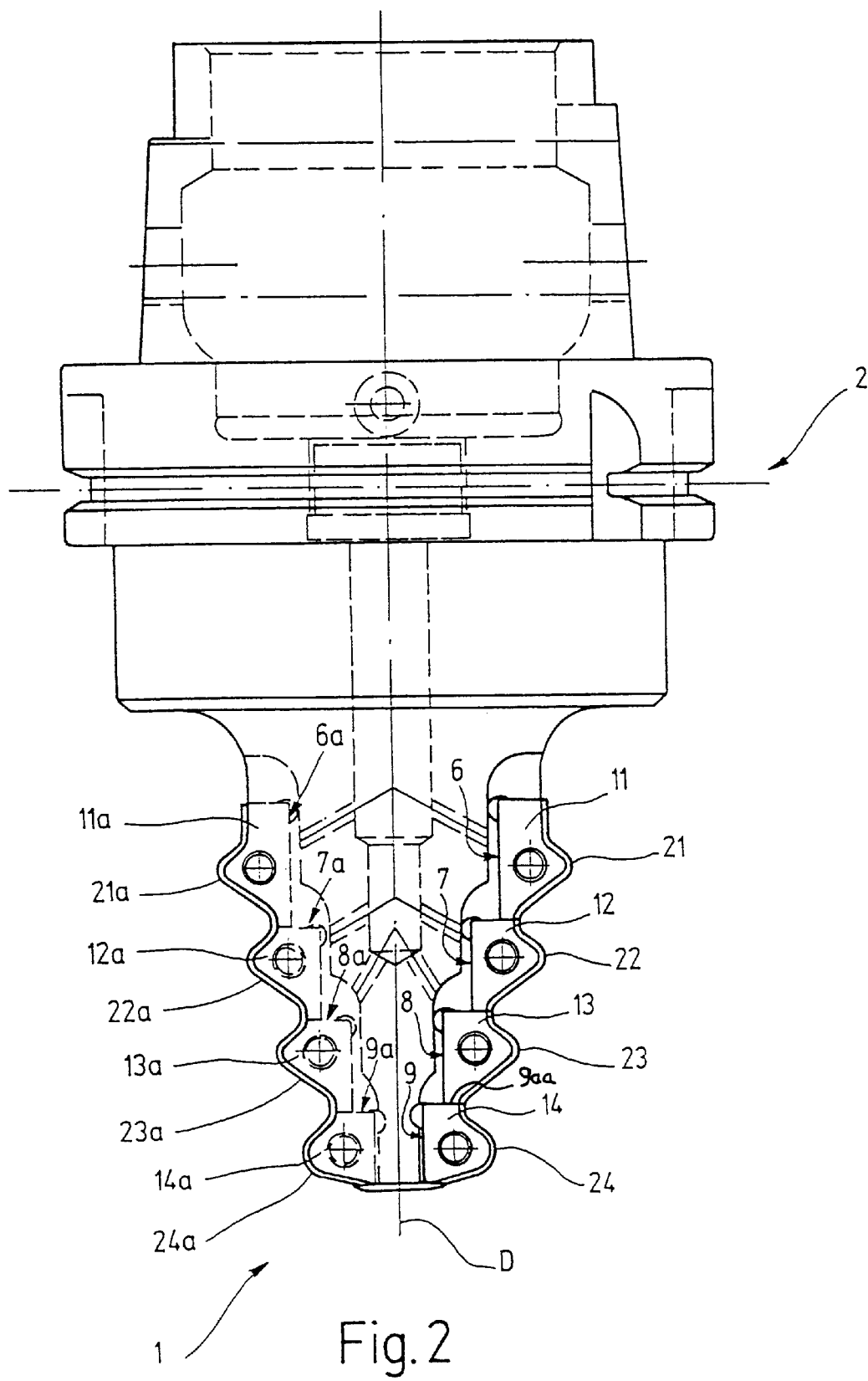
FIG. 2 is a perspective view of the tool of FIG. 1.

The connection of the cutting edges 21 through 24 to one another can be seen from FIG. 2. It can also be seen that the cutting tips 11, 12, 13, 14 are disposed at the same spacing from the pivot axis D of the tool body 2 as corresponding cutting tips 11a, 12a, 13a, 14a, which are disposed opposite with respect to the pivot axis D, and whose cutting edges 21a, 22a, 23a, 24a again supplement one another to form one complete, continuous cutting edge. The number of blades in this profile milling cutter 1 is therefore two. However, it is also possible to offset the cutting edges 21, 22, 23, 24 somewhat from the cutting edges 21a, 22a, 23a, 24a, so that only portions of each cutting edge become active at a time. For example, the cutting edges 21, 22, 23, 24 can be active with their portion facing upward in FIG. 2 and with their tooth tip, while the cutting edges 21a, 22a, 23a, 24a are active with their respective lower region and tooth tip. In this way, the number of blades at the tooth tip is equal to 2, while otherwise it is 1. However, it is preferable for both of the blades created by lining up the individual cutting edges 21, 22, 23, 24; and 21a, 22a, 23a, 24a to be embodied such that they are precisely congruent.

Between axially adjacent cutting tips, there is a seam or a small gap. This is true for both the cutting tips 11–14 and the cutting tips 11a–14a. The seams or gaps in the row formed by the cutting tips 11–14 are offset axially from the seams and gaps in the row formed by the cutting tips 11a–14a. Therefore, the cutting tip 14 is not the same as the cutting tip 14a. They differ from each other insofar as their axial end faces are axially offset. This is evident from FIG. 2 which depicts line 9a between cutting inserts 13a and 14a as axially offset from line 9aa between cutting inserts 13 and 14. The same is true for the other cutting tips 11, 11a; 12, 12a; 13, 13a; 14, 14a that respectively overlap one another in the circumferential direction.

Figures 3, 4:
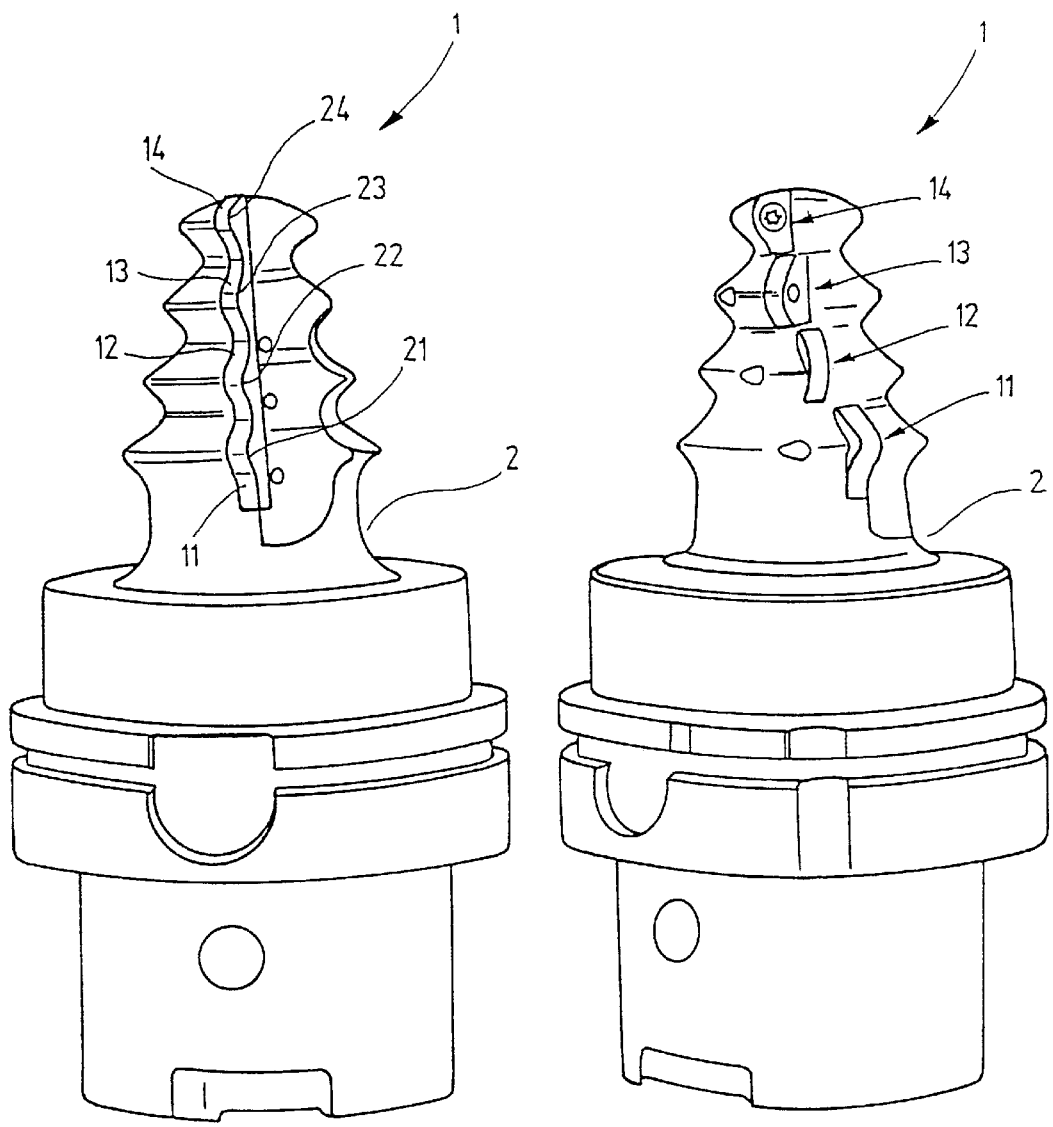
FIG. 3 is a perspective view of the machining tool of FIG. 1, as seen from a different direction.
FIG. 4 is a perspective view of a modified embodiment of the machining tool for precision machining with interchangeable cutting tips.

This is also true for the profile milling cutter 1 of FIG. 4, in which the cutting tips 11, 12, 13, 14 are offset somewhat from one another in the circumferential direction. However, the cutting tips 11, 12, 13, 14 are installed each with the same radial effective cutting angle, so that the cutting conditions match. However, they come into engagement with the workpiece successively, so that the tool body has to transmit only the driving torque for one cutting tip at a time. More favorable conditions in terms of chip removal are also obtained, because the chips occur in succession as do the cutting tips.

Figure 5:
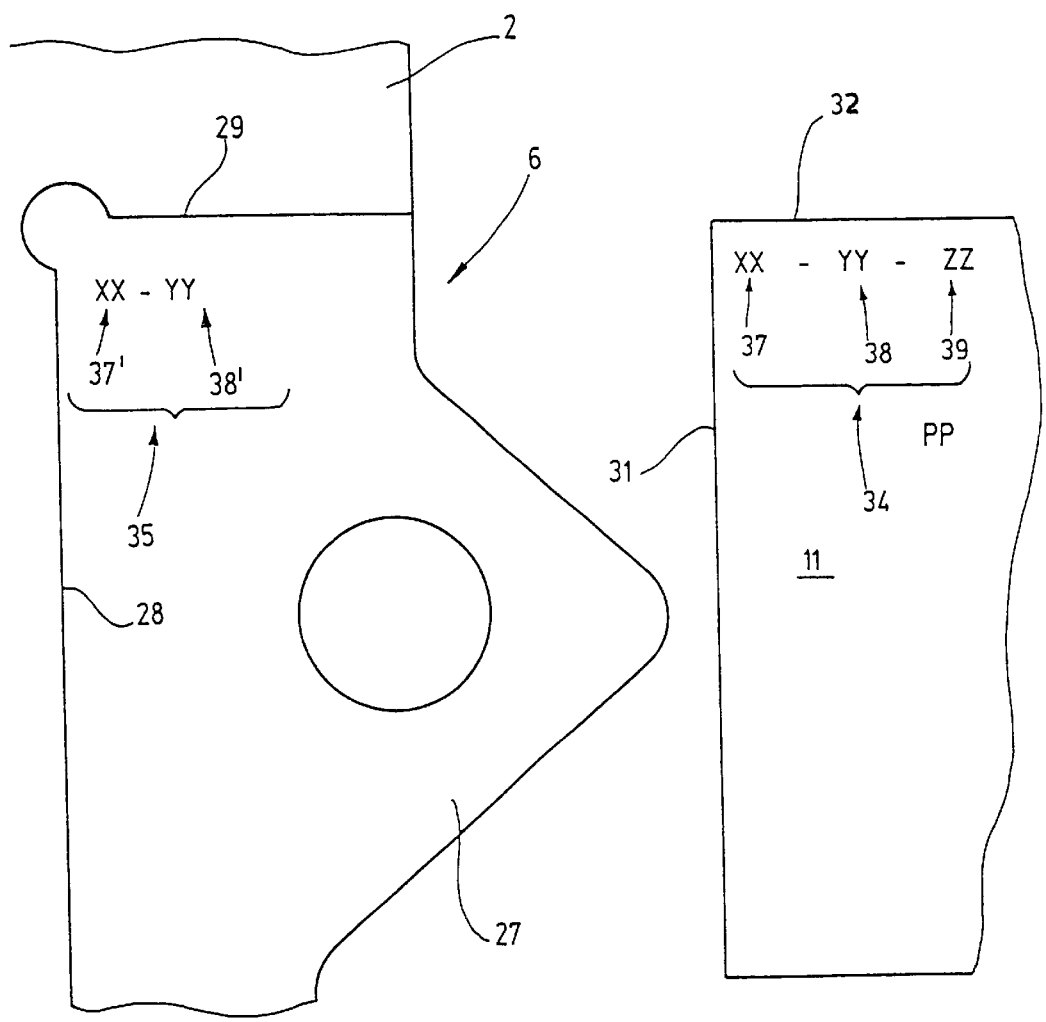
FIG. 5 is a fragmentary, schematic view and on a different scale of one tip seat and a cutting tip separate from it.

In all the profile milling cutters 1 presented, a tip seat as shown in FIG. 5 is provided. The tip seat has a plane bearing face 27, which corresponds approximately to the contour of the respective cutting tip, so that the cutting tip is supported over virtually its entire back side (bottom face). The bearing face 27 is adjoined by bearing faces 28, 29, which are at right angles to one another and to the bottom face 27 and to which corresponding side faces 31, 32 of the cutting tip 11, 12, 13 or 14 are assigned. In FIG. 5, the cutting tip 11 is shown, to represent all the other cutting tips. The perpendicular orientation of the bearing faces 28, 29 relative to the bearing face 27 produces a secure, accurately replicable bearing of the cutting tip 11. The exact position of the cutting tip 11 is dependent on tolerances of the tip seat 6 and of the cutting tip 11.

In order to preclude the influence of these tolerances on the accuracy of positioning of the cutting edge 21, the cutting tip 11 is provided with a marking 34, which is associated with a marking 35 of the tip seat 6 or with the tip seat 6 itself. The marking 34 for instance includes a plurality of groups of numerals 37, 38, 39. For example, the first group of numerals 37 corresponds to a number XX of the tool body 2 that individually characterizes this tool body. All the tool bodies of a given tool model can be provided with an individual number XX, which uniquely identifies the tool body and distinguishes it from other tool bodies.

The second group of numerals 38 is for instance a number that identifies the tip seat. In the present example, the profile milling cutter 1 has a total of 8 tip seats, so that a number between one and 8 can serve as the second group of numerals 38.

Optionally, a final group of numerals 39 can represent the number of the set of cutting tips to which the applicable cutting tip 11 belongs. It can be assured in this way that only cutting tips belonging to one and the same set of cutting tips will be mounted on the tool body 2.

The tool body 2 is provided with the marking 35 on or beside its tip seat 6 and the other tip seats, and this marking represents at least the number XX of the tool body in the form of a group of numerals 37' and the number YY of the tip seat in the form of a group of numerals 38'.

In addition, a numeral or group of numerals PP can be provided on the cutting tips 11 through 14 and 11a through 14a; it serves to identify the profile, or in other words the blade form defined by the cutting tips. One and the same tool body 2 can generate different profiles by being equipped with different cutting tips.

The production and use of the profile milling cutter 1 is as follows:

In production, the tool body 2, at its individual tip seats, is first provided with individual identification numerals XX and with numbers YY. The numerals XX identifying the tool body can be disposed on each tip seat or at a single other point. They are engraved, for instance. Sets of cutting tip blanks put together from cutting tip blanks are assigned to the tool body 2; they include one cutting tip 11, 12, 13, 14 each, still in the form of a blank, for each tip seat 6, 7, 8, 9. Each cutting tip blank is then provided with a marking 34, which as a group of numerals XX represents the number of the tool body, as a group of numerals YY represents the individual tip seat, and as a group of numerals ZZ represents the number of the cutting tip set to which it belongs. Once each cutting tip blank has been installed in the respective tip seat assigned to it, the tool body is received by a precision grinding machine, and both the cutting edges 21, 22, 23, 24 and the corresponding cutting edges 21a, 22a, 23a, 24a are defined with positional and shape precision, in that the corresponding faces of the cutting tips 11, 12, 13, 14 (11a, 12a, 13a, 14a) are ground on their corresponding faces. To that end, the cutting tips 11, 12, 13, 14 are ground for instance on their tool faces, and if needed also on their chip faces. After the grinding operation, the cutting edges of the profile milling cutter 1 exist, with the requisite accuracy. The cutting tips 11, 12, 13, 14 and 11a, 12a, 13a, 14a are now removed again, and the cutting tips of the next set of cutting tips are installed. These cutting tips have again been provided beforehand with a suitable marking.

In this way, gradually, all the sets of cutting tips are mounted on the tool body 2 and precision-ground and then removed from the tool body 2 again. After the grinding, the cutting tips 11–14a of the individual sets of cutting tips are subjected to one further treatment. This can be, for instance, the intentional rounding of the cutting edges and/or the coating of the cutting tips with a layer of hard material. The layer of hard material is a few micrometers thick, for instance, so that an accuracy of ±1/100 mm, for instance, attained by the grinding machine is not impaired in the least. Once all the post machining operations on the cutting tips have been completed, the tool body 2 is shipped with the sets of cutting tips. A first set of cutting tips can already be installed in place by then.

The profile milling cutter 1 can be used immediately for precision machining operations, such as finish-milling of suitably shaped slots. Once the cutting tips 11–14a are worn, the cutting tips from the next set of cutting tips are simply installed; cutting tips with the groups of numerals XX, YY are in each case mounted on the tip seats that have the same group of numerals XX, YY. In this way, in the cutting tip installation, the accuracy obtained by the fine grinding is reproduced with regard to the position and shape of the cutting edges.

What is claimed is:

1. A machining tool for precision machining operations, comprising:
   a tool body (2) having a plurality of tip seats (6, 7, 8, 9),
   a plurality of cutting tips (11, 12, 13, 14), each of which has at least one cutting edge (21, 22, 23, 24) and which are arranged each to be secured in a tip seat (6, 7, 8, 9) on the tool body (2),
   a releasable securing means (15, 16, 17, 18) for respectively securing the cutting tips (11, 12, 13, 14) to the tip seats (6, 7, 8, 9),
   wherein said cutting tips (11, 12, 13, 14) carry a marking so that each one individually corresponds to a specific one of said tip seats (6, 7, 8, 9), and
   wherein said cutting edges of the cutting tips are defined by grinding each of the cutting tips while such cutting tip is installed on the tool body in its corresponding tip seat.

2. The machining tool of claim 1, characterized in that each cutting tip (11, 12, 13, 14) is provided with an individual marking (34), which identifies the tip seat (6, 7, 8, 9) to which the cutting tip (11, 12, 13, 14) is assigned.

3. The machining tool of claim 1, characterized in that at least some tip seats (6, 7, 8, 9) are embodied identically to one another.

4. The machining tool of claim 1, characterized in that the cutting tips (11, 12, 13, 14) each have a plurality of cutting edges or cutting edge regions.

5. The machining tool of claim 4, characterized in that the cutting edges (21, 22, 23, 24) of the cutting tips (11, 12, 13, 14) overlap to form at least one complete cutting blade, with overlapping regions in the tooth tip regions.

6. The machining tool of claim 1, characterized in that the tool body (2) has two rows of tip seats (6, 7, 8, 9; 6a, 7a, 8a, 9a), whose cutting tips (11, 12, 13, 14; 11a, 12a, 13a, 14a) are axially offset from one another.

7. The machining tool of claim 1, characterized in that each tip seat (6, 7, 8, 9) is provided with a respective marking (35), which distinguishes it from all the other markings of the other tip seats and that the marking (34) provided on the cutting tip is referred to the marking (35) of the associated tip seat.

8. The machining tool of claim 1, characterized in that the cutting tips (11, 12, 13, 14) are provided with an additional marking which identifies the blade shape.

9. The machining tool of claim 1, characterized in that the ground section on each cutting tip (11, 12, 13, 14) defines a positive clearance angle.

10. The machining tool of claim 1, characterized in that the cutting tips (11, 12, 13, 14) are provided with a coating, which has been applied to them after the cutting tips (11, 12, 13, 14) have been ground.

11. The machining tool of claim 10, characterized in that the coating has been applied to the cutting tips (11, 12, 13, 14) while the cutting tips are removed from the tool body (2).

12. The machining tool of claim 11, characterized in that the coating is a PVD, TiN or TiC coating.

13. The machining tool of claim 1, characterized in that the cutting tips (11, 12, 13, 14) are provided with a defined rounding on their cutting edges (21, 22, 23, 24).

14. The machining tool of claim 1, characterized in that the tool body (2) and the tip seats (6, 7, 8, 9) are embodied such that the cutting tips (11, 12, 13, 14), while installed on the tool body (2), have an axial chip angle of essentially zero, and that the cutting tips (11, 12, 13, 14) are disposed on a helical line.

15. The machining tool of claim 1, characterized in that the tip seat (6, 7, 8, 9) has a plane bearing face (27) and bearing faces (28, 29) oriented at right angles thereto.

16. The machining tool of claim 1, characterized in that a plurality of complete sets of cutting tips are assigned to the tool body (2), and each cutting tip set has a suitably identified cutting tip (11, 12, 13, 14) for each tip seat (6, 7, 8, 9).

17. The machining tool of claim 2, characterized in that each cutting tip (11, 12, 13, 14) is provided with an additional marking (37), which identifies the tool body (2) to which it is assigned.

18. A method for providing cutting tip-equipped precision tools, comprising:
  providing a tool body (2) having a plurality of tip seats (6, 7, 8, 9);
  providing at least one complete set of cutting tips, with at least one of said cutting tips (11, 12, 13, 14) being adapted to each of said tip seats (6, 7, 8, 9); assigning each of said cutting tips (11, 12, 13, 14) to a respective one of said tip seats (6, 7, 8, 9), and installing the cutting tips (11, 12, 13, 14) in their assigned tip seats (6, 7, 8, 9);
  grinding the cutting tips (11, 12, 13, 14) while the cutting tips are installed in their respective assigned tip seat for formation of their cutting edges (12, 22, 23, 24);
  marking said cutting tips to identify the respective tip seats to which each has been assigned;
  separating the cutting tips (11, 12, 13, 14) from their respective tip seats (6, 7, 8, 9) and post-treating the cutting tips; and
  resecuring the cutting tips (11, 12, 13, 14) to their respective assigned tip seats (6, 7, 8, 9).

19. The method of claim 18, characterized in that the cutting tips (11, 12, 13, 14) are provided with an engraving, which identifies the tip seat (6, 7, 8, 9) to which the cutting tip (11, 12, 13, 14) is assigned.

20. The method claim 19, characterized in that each tip seat (6, 7, 8, 9) of the tool body (2) is provided with a marking (35), which is distinguished from the markings (35) of other tip seats (6, 7, 8, 9).

21. The method claim 19, characterized in that each cutting tip (11, 12, 13, 14) of the set of cutting tips is provided with a marking (37), which designates the tool body to which the cutting tip set belongs.

22. The method claim 21, characterized in that each tool body (2) is provided with a marking (37') that individualizes it.

23. The method of claim 18, characterized in that a plurality of cutting tip sets is assigned to each tool body (2).

* * * * *